United States Patent
Kundu et al.

(10) Patent No.: US 7,904,086 B2
(45) Date of Patent: Mar. 8, 2011

(54) METHOD AND COMPUTER PROGRAM FOR HANDOFF OF MOBILE DEVICES BETWEEN WIRELESS SYSTEMS

(75) Inventors: Sumantra R. Kundu, Arlington, TX (US); Sourav Pal, Arlington, TX (US); Kalyan Basu, Plano, TX (US); Sajal K Das, Denton, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 552 days.

(21) Appl. No.: 11/541,886

(22) Filed: Oct. 2, 2006

(65) Prior Publication Data

US 2008/0080462 A1    Apr. 3, 2008

(51) Int. Cl.
*H04Q 7/20* (2006.01)
(52) U.S. Cl. .......................................... 455/436
(58) Field of Classification Search ............... 455/436
See application file for complete search history.

(56) References Cited

U.S. PATENT DOCUMENTS

| | | | |
|---|---|---|---|
| 2004/0264435 A1* | 12/2004 | Chari et al. | 370/351 |
| 2005/0078636 A1* | 4/2005 | Zhang et al. | 370/331 |
| 2005/0138178 A1* | 6/2005 | Astarabadi | 709/227 |
| 2006/0146803 A1* | 7/2006 | Bae et al. | 370/352 |
| 2006/0165133 A1* | 7/2006 | Yokota et al. | 372/6 |
| 2007/0014259 A1* | 1/2007 | Fajardo et al. | 370/436 |

* cited by examiner

*Primary Examiner* — Dwayne D Bost
*Assistant Examiner* — Joseph Dean, Jr.
(74) *Attorney, Agent, or Firm* — Chowdhury & Georgakis, P.C.

(57) ABSTRACT

A method and computer program are provided for handing off a mobile device in communication with a first wireless system having a first network address to one or more other wireless systems within communication range of the mobile device. The method and computer program include periodically monitoring by the mobile device of communications from the first wireless system and the other wireless systems, calculating a signal strength associated with each of the monitored communications, selecting one of the other wireless systems, and transferring communication to the selected wireless system upon detection of a predetermined threshold of the signal strength associated with the first wireless system.

16 Claims, 11 Drawing Sheets

METHOD AND COMPUTER PROGRAM FOR HANDOFF OF MOBILE DEVICES BETWEEN WIRELESS SYSTEMS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of IIS-0326505 awarded by the National Science Foundation (NSF).

BACKGROUND OF THE INVENTION

1. Field of the Invention

The present invention relates to wireless terminal devices and more particularly relates to a method and computer program for communicating, transferring or handing off mobile devices between wireless infrastructure systems without substantially impairing the performance of delay and loss sensitive network applications.

2. Discussion of the Background

Communications networks, such as local area networks ("LAN") or wide-area networks ("WAN") allow connected devices to access network applications over the network. For instance, the Internet is a global network of connected computer networks providing network applications and data content to connected devices. Connected devices may include, without limitation, desktop computers, laptop computers, servers, palmtop or other hand-held computers, personal digital assistants, Internet enabled mobile phones, pagers, digital capturing devices (e.g., digital cameras and video cameras), Internet appliances, e-books, wireless sensor devices and the like. Connected devices are connected to the wired and wireless networks using numerous techniques known in the art. For instance, mobile devices are commonly connected to a computer network using radio technology in communication with a wireless system, such as a wireless access point ("WAP"), a cellular base station or the like that is connected to the Internet.

The radio communication between a mobile device and a wireless system may deteriorate due to various factors including, without limitation, communication range, signal interference and movement of the mobile device with respect to the wireless system. Wireless systems typically have a limited communication range varying from one hundred meters or less for WAPs to several miles for wireless systems utilizing cellular telephony.

As is generally known in the art, in order for a mobile device to communicate with a wireless system, it must first find one or more wireless systems. The process of finding a wireless system is known as service discovery. Active service discovery requires the mobile device to broadcast PROBE REQUEST messages over one or more channels. If a wireless system is within the mobile device's communication range, the wireless system responds by transmitting a PROBE RESPONSE to the mobile device. Not every wireless system within the communication range of the mobile device will respond to a PROBE REQUEST. For instance, the responding wireless systems may be limited to those wireless systems matching one or more parameters of the inquiry. The response from a wireless system generally will include information necessary for the mobile device to access the network including a description of the network. The mobile device will process the responses received from the wireless systems within the communication range of the mobile device. After receiving the responses to the PROBE RESPONSE, the mobile device will have accumulated information about the wireless systems within communication range of the mobile device. Once a mobile device has performed an PROBE RESPONSE, the mobile device may choose to join a network via one of the available wireless systems.

After joining a network, the mobile device may transmit and receive data across the network using radio technology or the like via the wireless system. If the communication between the mobile device and the wireless system fails before the completion of a transmission, then the data may be irretrievably lost. For instance, if the mobile device physically moves out of the communication range of a wireless system, then any communication between the mobile device and the wireless system will fail. Network communication is either lost or the session is severely degraded as the mobile device moves out of the vicinity and, thus, the beyond the communication range of the wireless system through which the mobile device is communicating.

A handoff is the process of transferring the communication process of a mobile device from one wireless system to another wireless system. Current technologies, such as those technologies that do not have dedicated control channels to communicate with network infrastructure, do not adequately handle communication with mobile devices while handing off the mobile device. Currently available handoff solutions incur roaming delays of between approximately 120 milliseconds to several seconds. Additionally, if the mobile device is required to join a different subnet, the handoff may incur additional delays of approximately 1-2 seconds or more.

A handoff may require allocation of a new IP address. The dynamic host configuration protocol ("DHCP") or IPv6 provides for the dynamic allocation of an IP address to a host, such as a mobile device, in a transmission control protocol/Internet protocol ("TCP/IP") network. Dynamic allocation is particularly useful for assigning an IP address to a host that will be connected to a network only temporarily or for sharing a limited pool of IP addresses among a group of hosts that do not need permanent IP addresses. The period over which an IP address is allocated to the host is referred to as a "lease."

Communication failures associated with current handoff solutions are especially problematic for delay sensitive network applications such as Voice-over-IP ("VoIP"), streaming multimedia and other real-time data services. Such delay sensitive network applications demand seamless and continuous network connectivity. The inter-packet delay for these applications typically ranges from approximately 50 milliseconds for demanding applications, such as VoIP, to approximately 150 milliseconds for less demanding applications, such as audio/video real-time streaming with frame coding (e.g., at 64K bps). Current handoff solutions of systems without dedicated control channels result in the loss of data packets which is clearly unacceptable for delay sensitive applications. There does not currently exist a way to reduce the time required to handoff a mobile device for these type of systems.

The Institute of Electrical and Electronics Engineers ("IEEE") 802.11 standard is commonly used for radio communication between a mobile device and a wireless system. The IEEE standard currently defines the specifications for a 802.11 media access control ("MAC") protocol and the RF-oriented physical parameters. However, the IEEE standard lacks a standardized roaming algorithm for the handoff of mobile devices between wireless systems. The IEEE standard also does not provide a dedicated control channel between the mobile device and wireless network. A proposed IEEE standard, referred to as IEEE 802.11r, advocates multi-vendor compatibility of wireless hardware devices and improved inter-wireless system communication messages. However, the proposed IEEE 802.11r standard does not adequately solve the handoff of a mobile device. For instance, implementations of the proposed IEEE 802.11r standard require upgrading and/or replacing already deployed wireless systems (e.g., wireless access points). This is an unsuitable solution because there currently exist approximately 30 million wireless systems using the 802.11 standard which would have to be upgraded and/or replaced.

Thus, there does not exist an effective way in the prior art to handle transmissions over a computer network during a handoff between wireless systems.

SUMMARY OF THE INVENTION

Accordingly, one aspect of the present invention is to provide a method for handing off a mobile device in communication with a first wireless system having a first network address to one or more other wireless systems within communication range of the mobile device. The method includes periodically monitoring by the mobile device of communications from the first wireless system and the other wireless systems, calculating a signal strength associated with each of the monitored communications, selecting one of the other wireless systems, and transferring communication to the selected wireless system upon detection of a predetermined threshold of the signal strength associated with the first wireless system.

Another aspect of the present invention is to provide a computer program embodied in a computer readable medium for handing off a mobile device in communication with a first wireless system having a first network address to one or more other wireless systems within communication range of the mobile device. The computer program includes a first computer code for periodically monitoring by the mobile device of communications from the first wireless system and the other wireless systems, a second computer code for calculating a signal strength associated with each of the monitored communications, a third computer code for selecting one of the other wireless systems, and a fourth computer code for transferring communication to the selected wireless system upon detection of a predetermined threshold of the signal strength associated with the first wireless system.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein.

DETAILED DESCRIPTION OF THE PREFERRED EMBODIMENTS

Referring now to the drawings, wherein like reference numerals designate identical or corresponding parts throughout the several views, preferred embodiments of the present invention are described.

According to the present invention, a mobile device in communication with a first wireless system will begin communication with a second wireless system prior to or immediately after losing communication with the first wireless system. The mobile device may begin communication with the second wireless system, such as a wireless access point ("WAP"), upon recognition that the signal strength of the first wireless system is deteriorating or losing strength. The handoff is handled quickly and substantially without interruption or loss of data packets, thereby, providing substantially seamless and continuous network connectivity during the handoff process. The present invention is thus particularly useful in improving the performance of delay sensitive applications, such as Voice-over-IP (VoIP) and streaming multimedia applications. The present invention may operate on widely available IEEE 802.11 wireless NIC cards with no customized support from the underlying operating system. However, the present invention is not limited to currently available wireless NIC cards and may optionally operate using customized support from the underlying operating system.

Background scanning is utilized to discover the presence of wireless systems in the surrounding network topology. The mobile device detects the presence of wireless systems in its vicinity by periodically scanning for radio signals from wireless systems. A wireless NIC card or the like is used to detect Wi-Fi signals indicative of a WAP within communication range. Other types of radio signals may also be detected that are indicative of other type of wireless systems, such as cellar systems, within the communication range of the mobile device within the scope of the present invention. Information relating to currently available wireless systems including, without limitation, security settings and network information, is collected and maintained by the mobile device. The mobile device may utilize standard protocol functions to collect the system information associated with a wireless system. Such system information may include identification, operation parameters, and status information of the wireless systems. For instance, such system information may include network addressing schemes for the wireless systems and/or name server information.

One problem associated with scanning for radio signals is that such scanning typically results in delays. For instance, during the period of time that the channel is selected for scanning, data cannot be received or sent. Additional delays in the wireless NIC are associated with switching channels. To reduce these delays, the present invention uses a combination of channel prioritization and dynamic prediction to select a wireless system with minimal or no delay.

Communication using a particular wireless system may be desired for a number reasons including, without limitation, the wireless system's security settings, network configuration, communication channel, better signal strength or the load in the associated wireless system. A particular level of security for a wireless system may be desired because the wireless system has the same security level as the currently connected wireless system, a minimum security level, a maximum security level, or a preferred security protocol. A handoff to a wireless system utilizing the same channel as the current wireless system may be desired because of the delay associated with switching channels. A particular channel may also be desired for other reasons including, without limitation, radio interference with other wireless systems, signal strength and existence of multiple wireless systems facilitating easier monitoring of the wireless systems and handoff process. Preferential selection of a particular channel over another channel is known as "channel prioritization."

The mobile device may also select a new wireless system based on its subnet with respect to the subnet of the current wireless system in communication with the mobile device. According to the present invention, mobile devices are configured to handle both Layer2 and Layer3 handoffs between wireless systems. A Layer2 handoff is a handoff between two wireless systems within the same subnet. The mobile device generally maintains the same IP address on the new wireless system in a Layer2 handoff. A Layer3 handoff is a handoff between two wireless systems having different subnets. The mobile device does not maintain the same IP address on the new wireless system in a Layer3 handoff. Instead, the mobile device would request a new IP address on the new subnet using a technique known in the art, such as the Dynamic Host Configuration Protocol ("DHCP"). Prior to a handoff, the mobile device compares the subnets of the available wireless systems to determine whether handing off the mobile device to an available wireless system will require a new IP address to be allocated. A Layer2 handoff that does not require a IP address allocation is preferred over a Layer3 handoff because of the possibility of delays associated with a Layer3 handoff and the increased possibility of packet loss.

The present invention uses, selective MAC layer packet buffering and background address request messages to remove noticeable delays associated with both Layer2 and Layer3 handoffs in Wi-Fi networks. In one embodiment, a handoff buffer is used for selectively storing packets during the handoff process. Moreover, buffering scheme is used for storing packets when the mobile node performs background monitoring of wireless systems which are within the wireless range of the mobile node. The power saving mode (PSM) feature available in IEEE 802.11 networks is utilized to buffer packets at the wireless system access point during a handoff and background monitoring of wireless systems to prevent packet loss. Utilizing the power saving mode feature decreases the probability of lost packets during link transitioning and makes the handoff process oblivious to the upper layer applications. However, other buffering techniques are possible within the scope of the invention.

Figure 1:
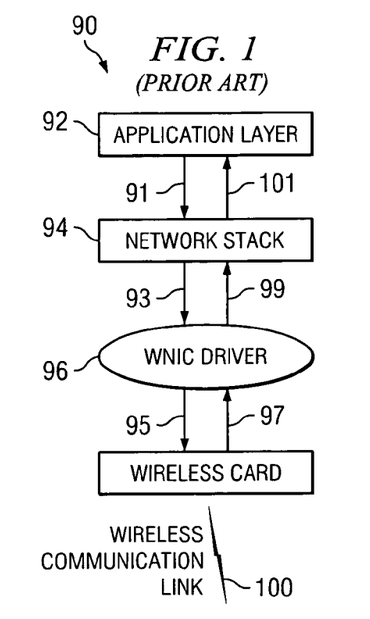
FIG. 1 is a block diagram illustrating logical network communication layers associated with a mobile device according to the prior art.
Figure 2:
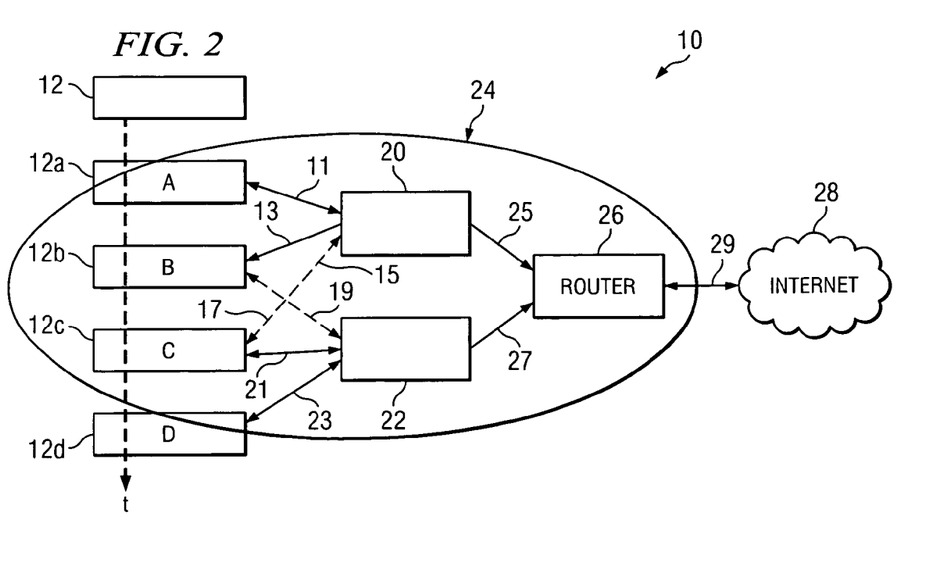
FIG. 2 is a block diagram illustrating the handoff of a mobile device between wireless systems within a single subnet according to the present invention.

Referring to FIG. 2, an exemplary block diagram illustrating the handoff of a mobile device 12 between multiple wireless systems within a single subnet is shown. In this example, the block diagram illustrates movement of a mobile device 12 at different physical locations A-D, respectively represented by 12a-12d, over time t within a single subnet 24. Subnet 24 includes two wireless systems 20 and 22 for simplicity, but is not limited to such within the scope of the present invention. Mobile device 12 periodically scans for available wireless systems within communication range. In this example, wireless system 20 is within communication range of mobile device 12 at locations A-C, and wireless system 22 is within communication range of mobile device 12 at locations B-D. Mobile device 12 also periodically selects an appropriate wireless system to communicate with. This selection may be based on numerous factors including, without limitation, the wireless system's availability, signal strength, security settings and network configuration. Mobile device 12 may be configured to scan for wireless systems at any time including, without limitation, predefined intervals or upon the signal strength of an existing wireless system deteriorating beyond a predetermined threshold. Referring to FIG. 2, wireless system 20 is detected by mobile device 12 at location A, wireless systems 20 and 22 are detected at locations B-C, and wireless system 22 is detected at location D.

At location A, mobile device 12 establishes a connection with wireless system 20. At location B, mobile device 12 detects wireless systems 20 and 22. In this example, mobile device 12 maintains the connection with wireless system 20 at location B. Maintaining a connection with a wireless system may be due to numerous factors including, without limitation, the availability, signal strength, security and subnet configuration of the available wireless systems. At location C, mobile device 12 detects wireless systems 20 and 22. Mobile device 12 disconnects from wireless system 20 and establishes a connection with wireless system 22. This is also known as handing off communication from wireless system 20 to wireless system 22. According to the present invention, the handoff occurs while mobile device 12 is within the communication range of wireless systems 20 and 22. The handoff may occur at location C for any number of reasons including, without limitation, availability, signal strength and security configuration of the available wireless systems. For instance, the handoff may occur because wireless system 22 has a stronger signal than wireless system 20. At location D, mobile device 12 detects wireless system 22. In this example, mobile device 12 maintains the connection with wireless system 22.

Figure 3:
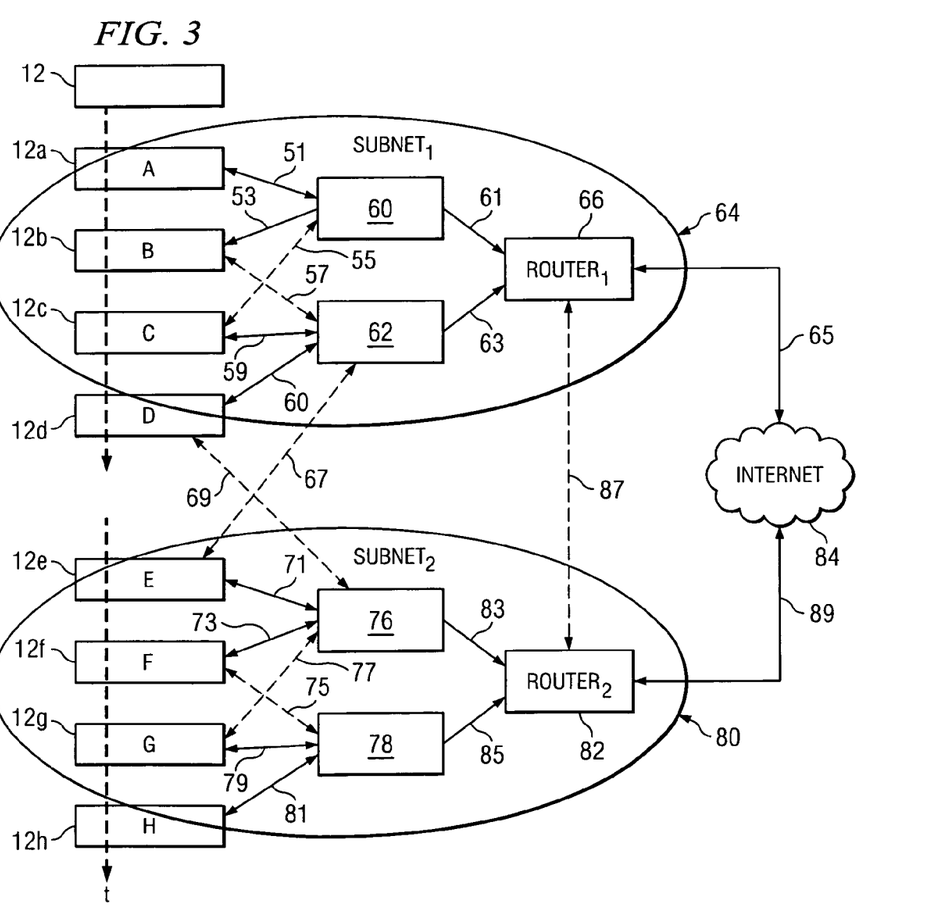
FIG. 3 is a block diagram illustrating the handoff of a mobile device between wireless systems within different subnets according to the present invention.

Referring to FIG. 3, a exemplary block diagram illustrating the handoff of a mobile device 12 between multiple wireless systems within different subnets is shown. In this example, the subnets are connected via routers 66 and 82. As previously discussed, a Layer2 handoff (i.e., a handoff between two wireless systems in which the mobile device may maintain the same IP address on the new wireless system) occurs when the handoff is between wireless systems within the same subnet, and a Layer3 handoff (i.e., a handoff between wireless system utilizing different IP addresses) occurs when the handoff is between wireless systems having different subnets. In this example, wireless system 62 is on a different subnet than wireless system 76. Handoffs automatically take place with no intervention from the user. FIG. 3 illustrates the movement of a mobile device 12 at different physical locations A-H, respectively, represented by 12a-12h, over time t within subnets 64 and 80. Mobile device 12 periodically scans for available wireless systems within its communication range. In this example, wireless system 60 is within the communication range of mobile device 12 at locations A-C, wireless system 62 is within the communication range of mobile device 12 at locations B-D, wireless system 76 is within the communication range of mobile device 12 at locations D-G, and wireless system 78 is within the communication range of mobile device 12 at locations F-H. Mobile device 12 periodically selects an appropriate wireless system to communicate with. The handoff between wireless systems 60 and 62 and between wireless systems 66 and 68 operate as discussed above with respect to FIG. 2. Thus, mobile device 12 at locations A-C and F-H operate as previously discussed in FIG. 2 with respect to handoffs between wireless systems having the same subnet.

The handoff between different subnets will now be discussed. At location D, mobile device 12 detects wireless systems 62 and 76. Mobile device 12 hands off communication from wireless system 62 to wireless system 76 at location E. As previously discussed, the handoff may occur for various reasons. For instance, the handoff may occur because wireless system 76 has a stronger signal than wireless system 62. Because wireless systems 62 and 76 are on two different subnets, there may be additional delays associated with this handoff including the time required to associate mobile device 12 with a new IP address. However, our invention supports acquiring IP of different subnets beforehand during the background monitoring phase to decrease the delay of L3 handoff process. Accordingly, this additional delay may be taken into consideration during the handoff. In one embodiment, mobile device 12 will handoff while the signal strength of the wireless system currently in communication with mobile device 12 is still strong enough to remain in communication during this increased handoff period.

Figure 4:
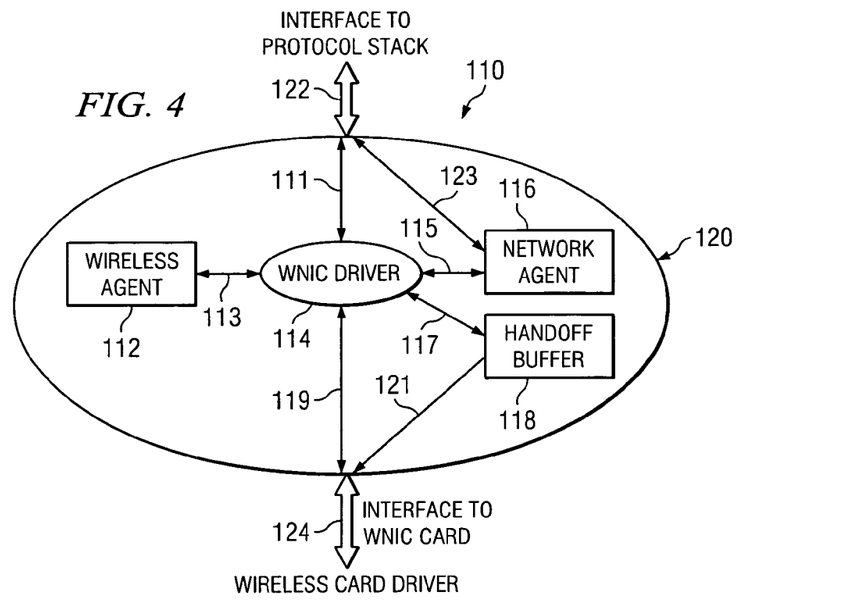
FIG. 4 is a block diagram illustrating an exemplary wireless driver interfacing with a TCP/IP stack according to the present invention.
Figure 5:
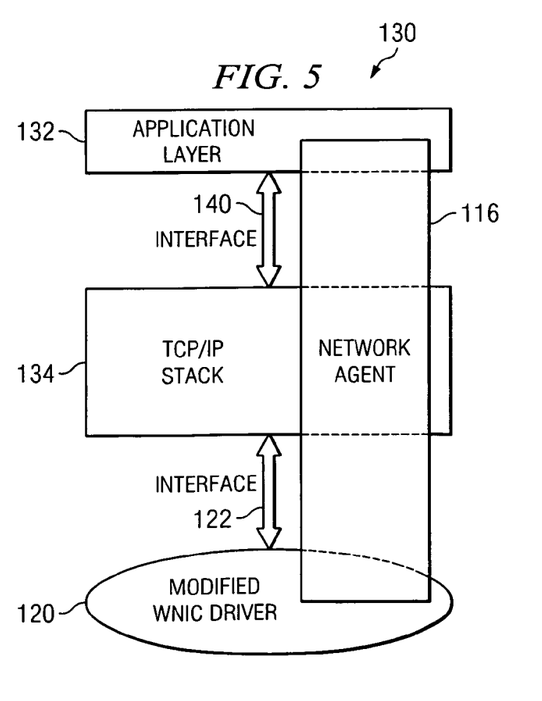
FIG. 5 is a block diagram illustrating an exemplary network agent interfacing with a TCP/IP stack according to the present invention.
Figure 6A:
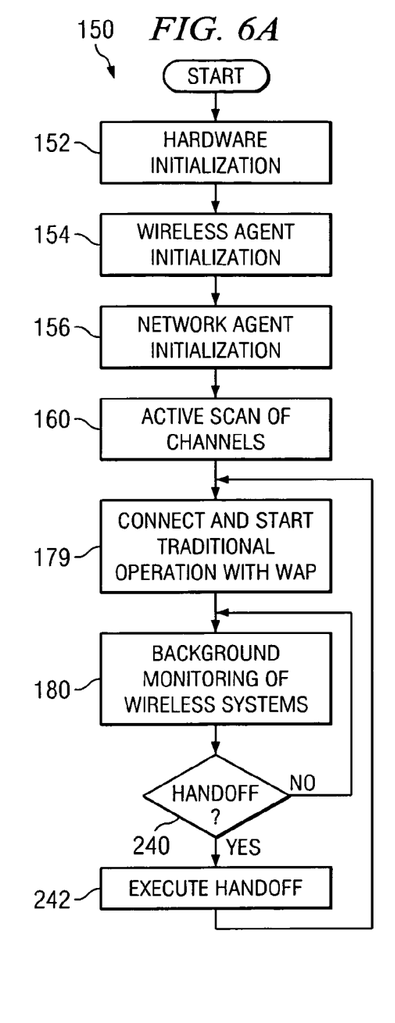
FIGS. 6A-6D are flow charts illustrating the process of handing off mobile devices between wireless systems according to the present invention.
Figure 6B:
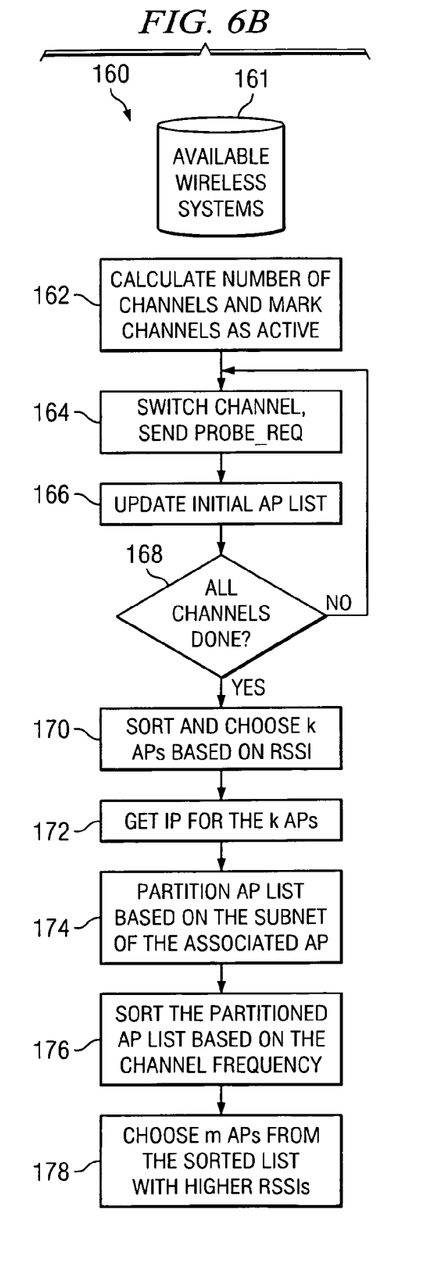
Figure 6C:
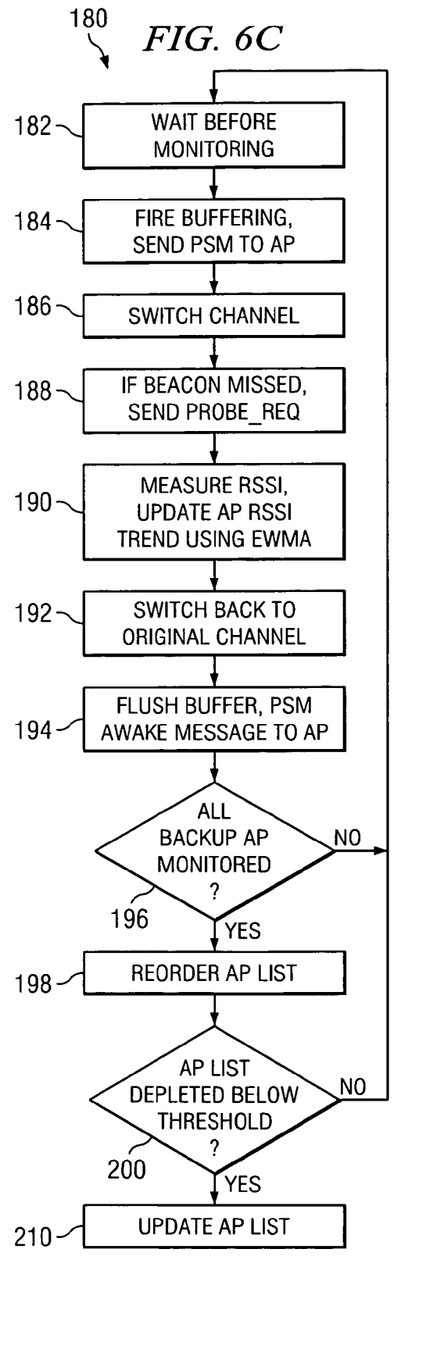
Figure 6D:
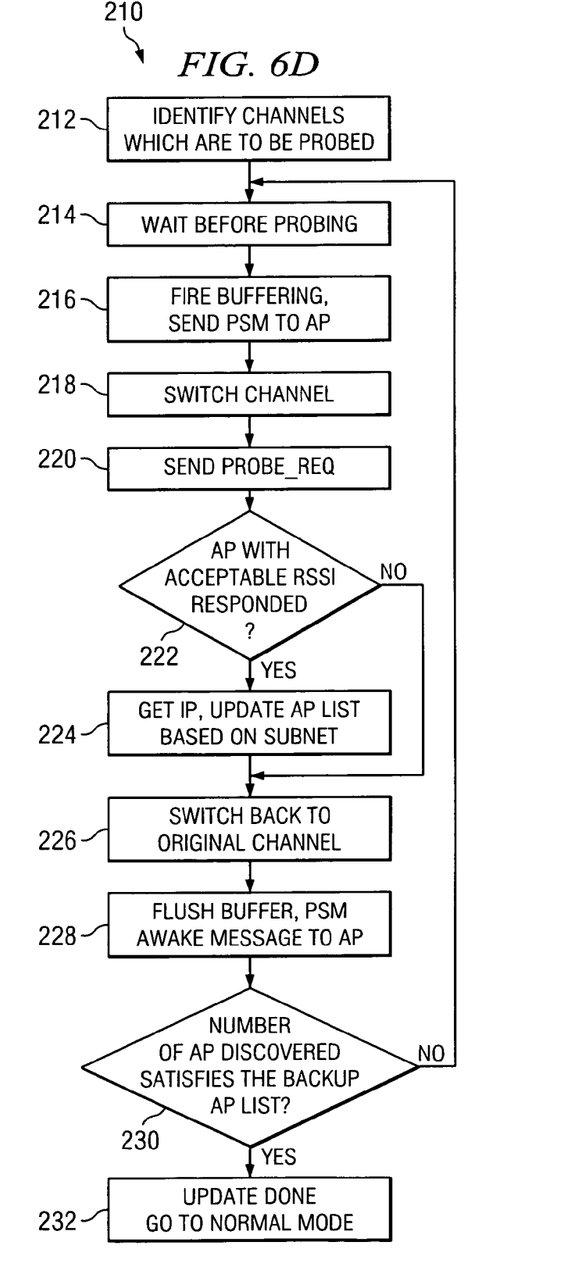
Figure 7A:
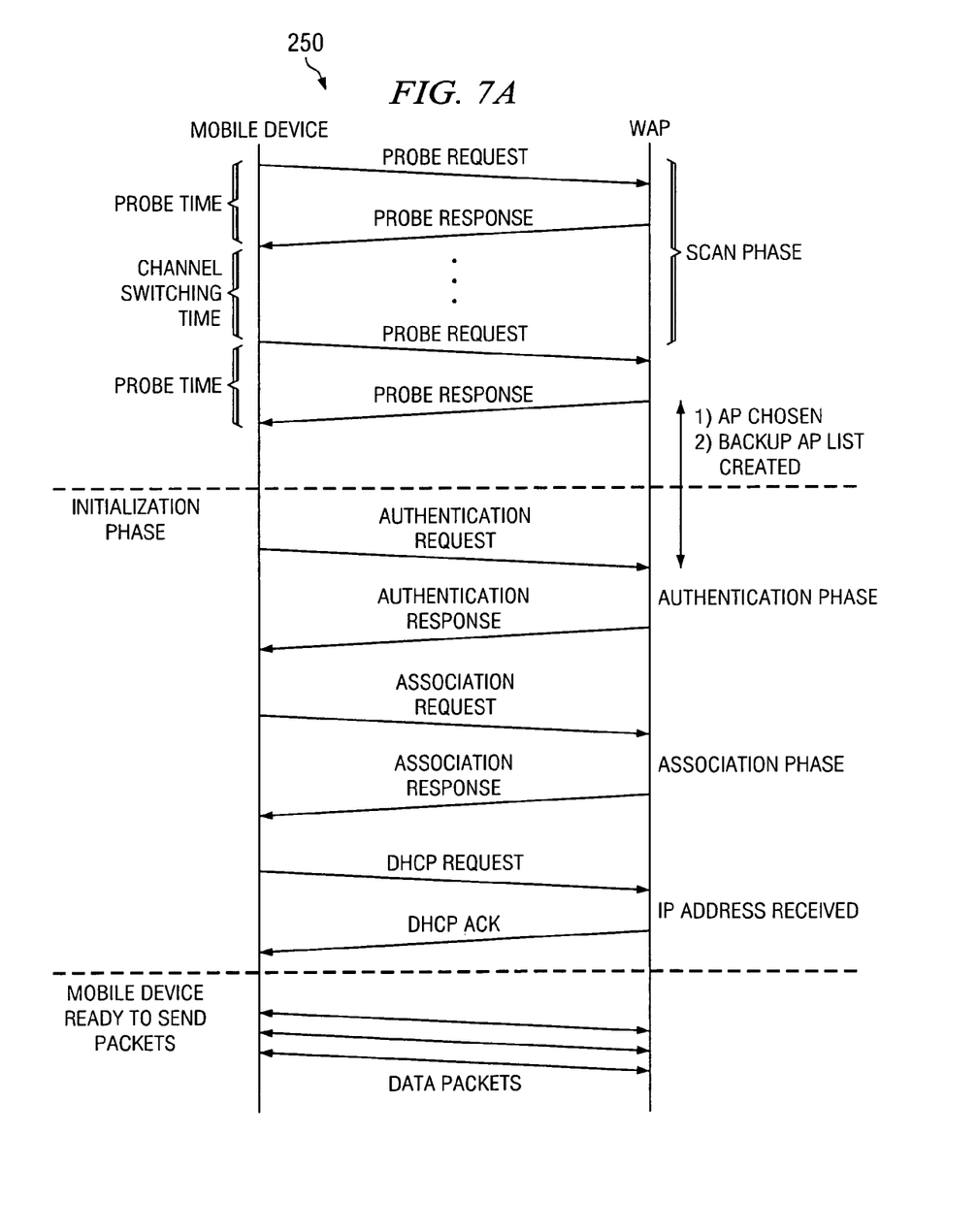
FIGS. 7A-7D are message diagrams illustrating the process of handing off mobile devices between wireless systems according to the present invention.
Figure 7B:
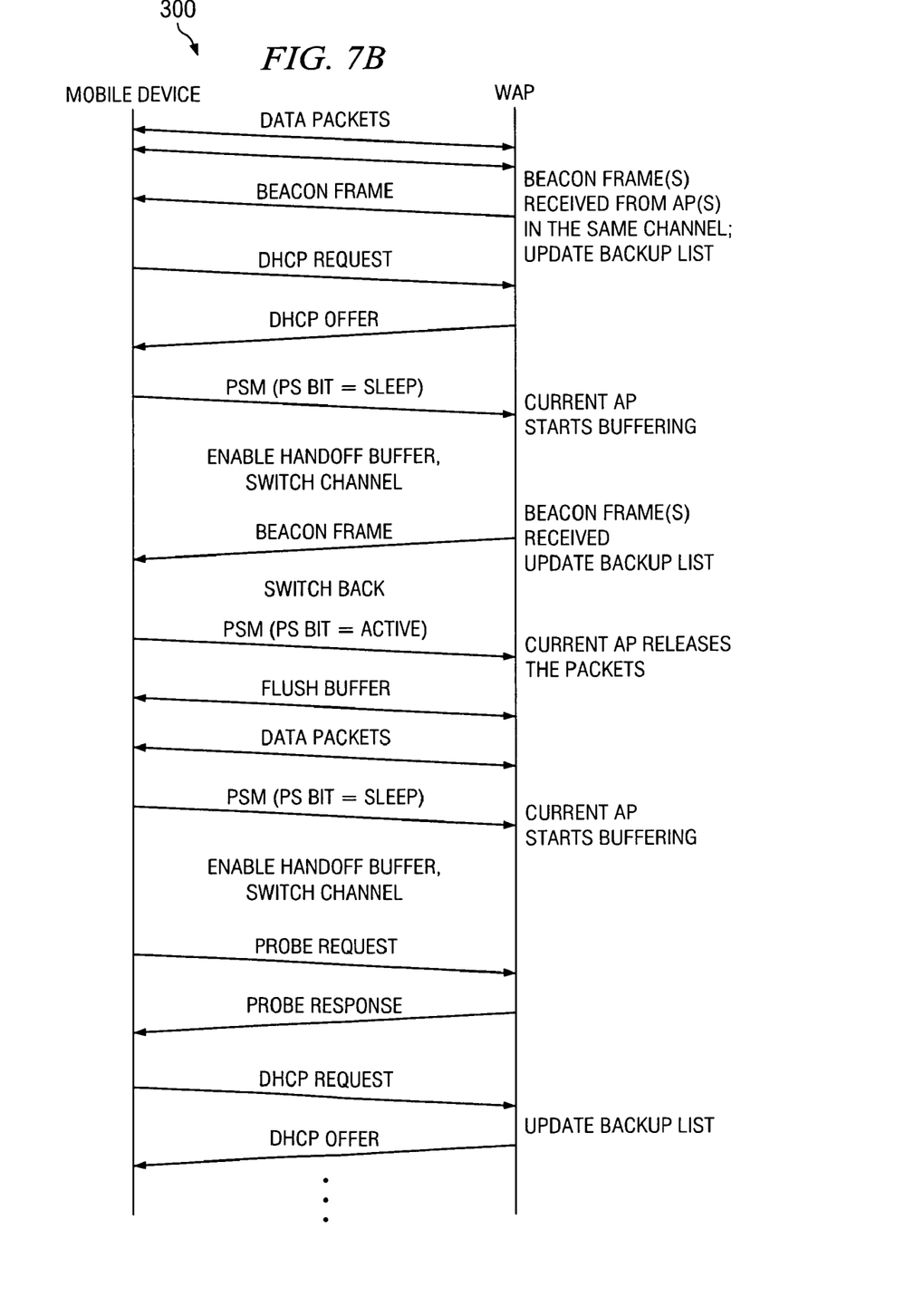
Figure 7C:
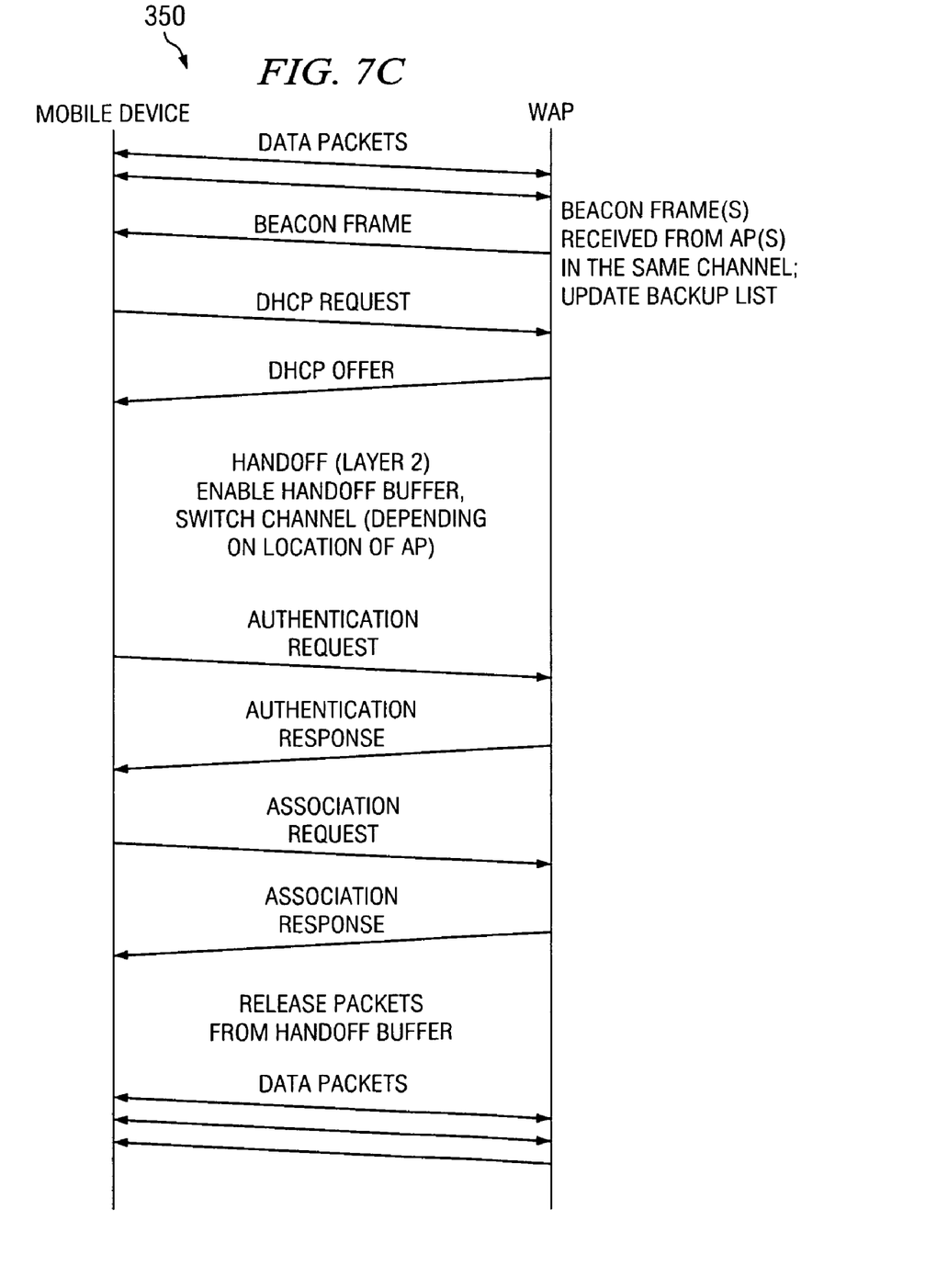
Figure 7D:
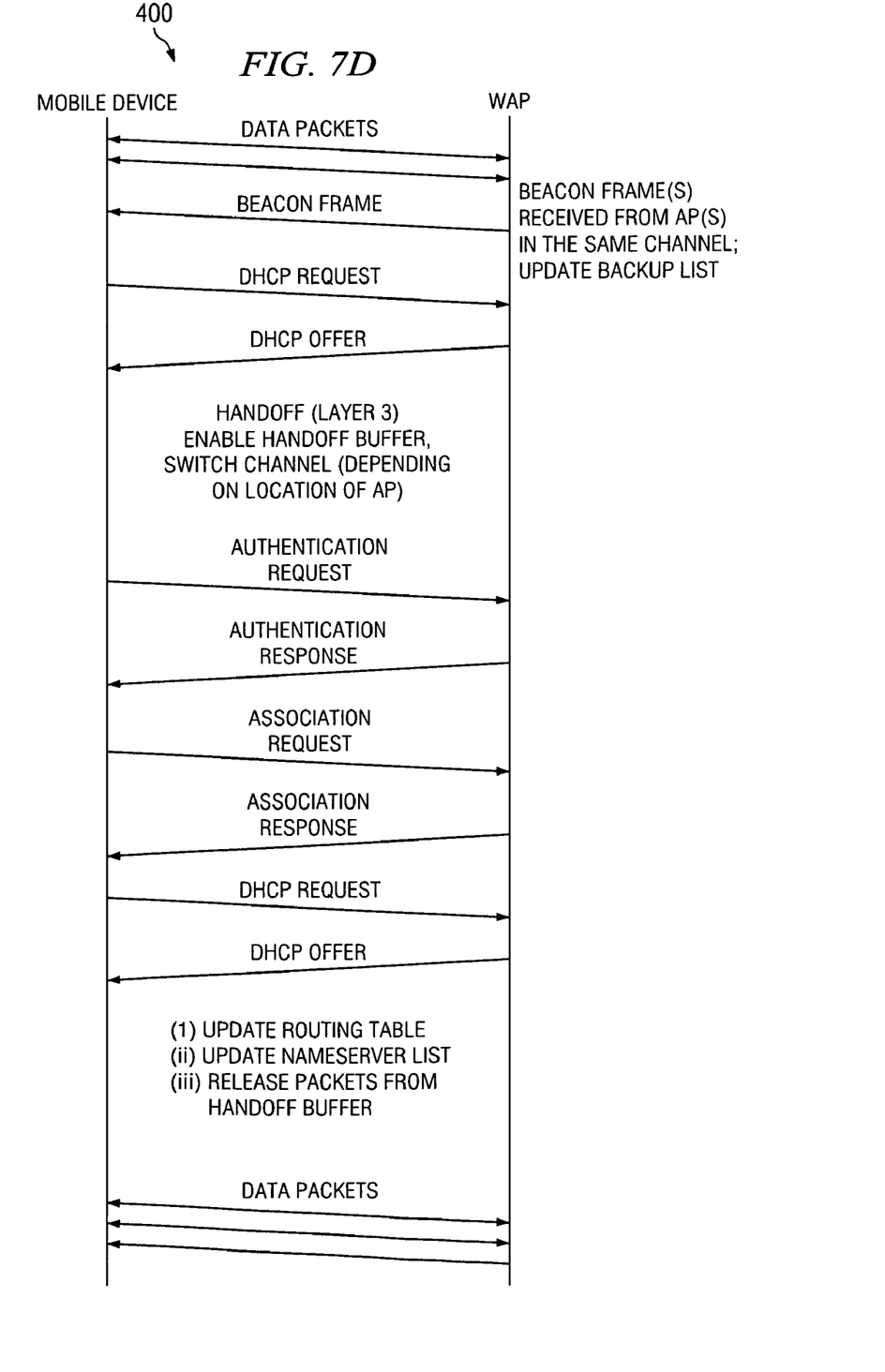
Figure 8:
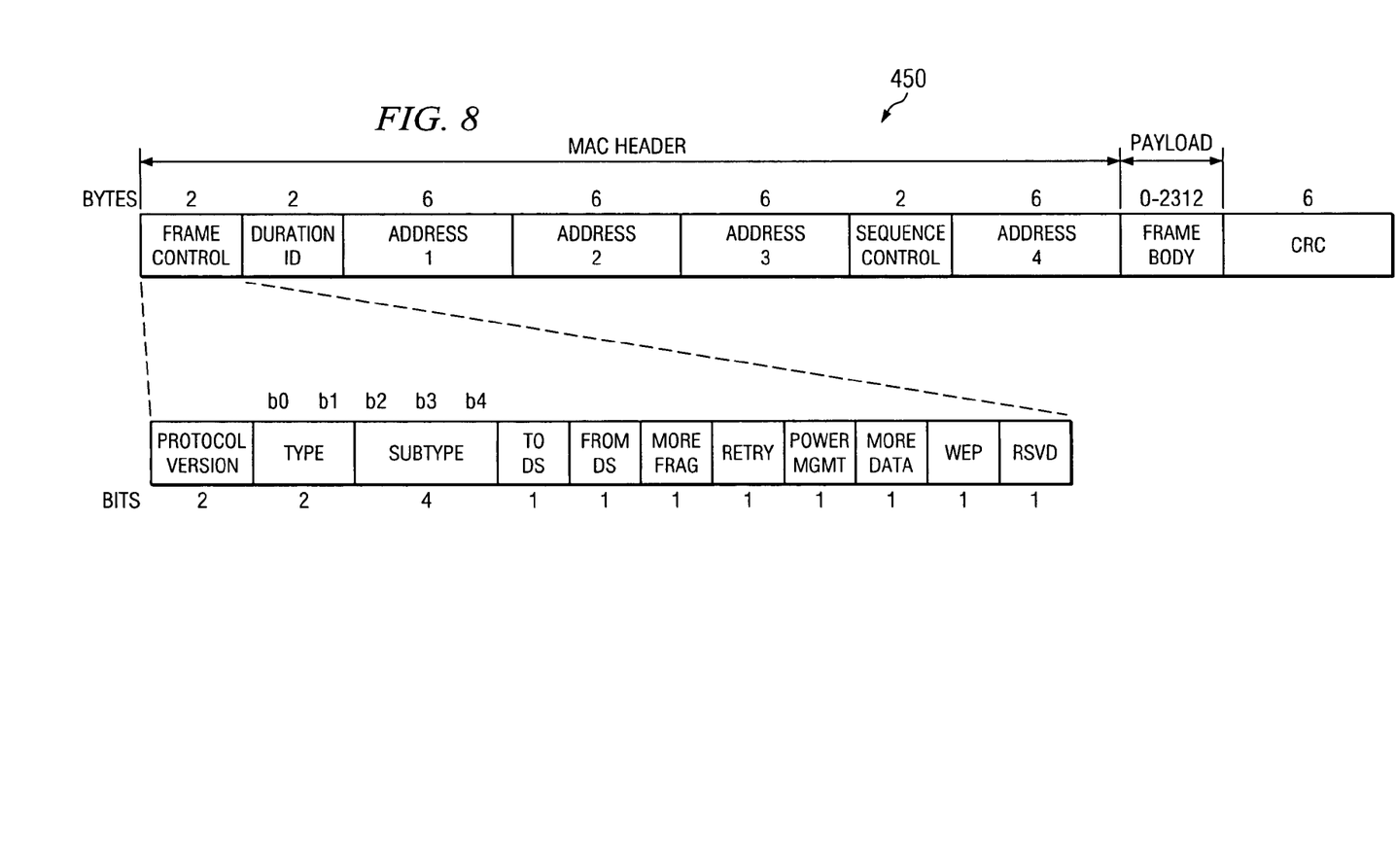
FIG. 8 is a block diagram illustrating 802.11 frame formats according to the present invention.
Figure 9:
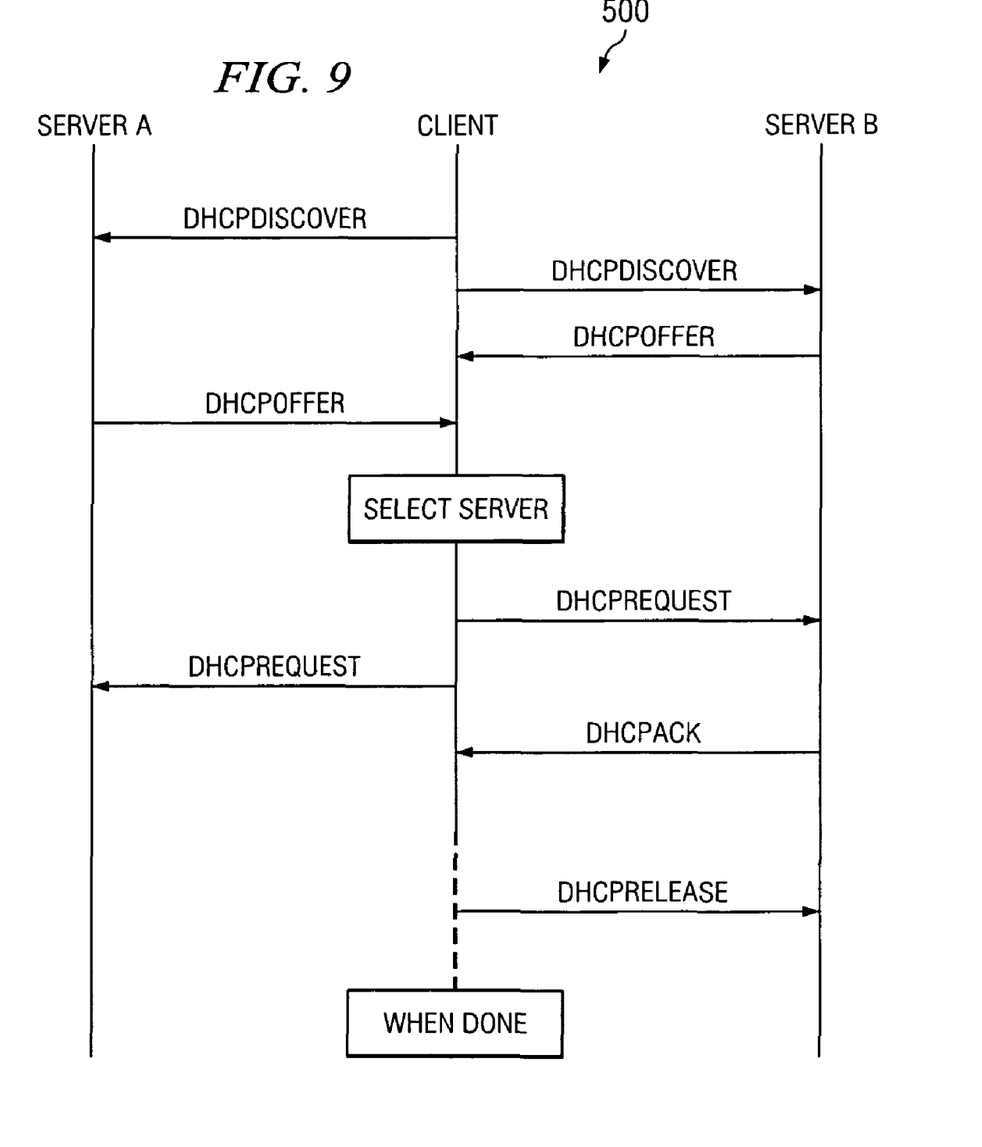
FIG. 9 is a block diagram illustrating the process of handing off mobile devices between wireless systems according to the present invention.

Referring to FIGS. 4 and 5, block diagram illustrating respectively an exemplary wireless driver and a network agent interfacing with a TCP/IP stack according to the present invention is shown. In one embodiment, the wireless driver includes a wireless agent 112, a network agent 116 and a handoff buffer 118. The wireless agent 112 is configured to monitor wireless signal strengths from one or more wireless systems (i.e., 20, 22, 60, 62, 76 and 78) which are either in the same channel of the associated AP or in different channels of the radio spectrum. Network agent 116 is configured to (i) monitor wireless signal strengths from one or more wireless systems (i.e., 20, 22, 60, 62, 76 and 78), (ii) correlate the quality of the received signals, (iii) communicate with DHCP servers and prefetch IP address of the different subnets which are within the wireless communication range of the mobile node and (iv) determine when a handoff is appropriate. Network agent 116 is also be configured to switch between different channels, and to handle Layer2 and/or Layer3 handoffs. To minimize and/or eliminate packet lost, a handoff buffer 118 is used to store network packets when the wireless radio frequency is switched and/or a handoff is initiated.

Referring to FIGS. 6A-6D, flow charts illustrating the process of handing off mobile devices between wireless systems according to the present invention are shown. At block 152, the hardware of the mobile device is initialized. This typically occurs during the hardware boot-up of the mobile device. The wireless agent and network agent are initialized respectively at blocks 154 and 156.

At block 160, an mobile device actively scans one or more radio frequencies (known as "channels"). The number of channels are calculated and marked as active at block 162. At block 164, an active scan is performed on the then-current channel. An active scan may include transmitting a PROBE_REQ message and waiting for a response from a wireless system. A list of available wireless systems 161 is updated at block 166. The mobile device will repeatedly switch channels, scan the then-current channel and update the list of available wireless systems 161, until all channels have been scanned at blocks 164-168. At block 170, the available wireless systems list 161 are sorted based on the RSSI. An IP address for the available wireless system is reserved at block 172. The available wireless systems list 161 is partitioned based on each wireless system's subnet at block 174. At block 176, the available wireless systems list 161 is sorted based on the channel frequency. Wireless system having the highest RSSI is selected from the available wireless systems list 161 at block 178.

At block 179, the mobile device connects and starts traditional operations with a wireless system.

Periodic background monitoring of the wireless systems is shown at block 180. At block 182, a delay between the periodic monitoring occurs. The mobile device instructs the then-connected wireless system to begin buffering by sending a PSM message to the wireless system at block 184. Moreover the mobile node starts inline buffering to prevent packet loss at the mobile end during the process. The mobile device switches the channel and broadcasts a PROB_REQ message in that particular channel and waits for a predetermined time to receive the PROBE_RES message from the wireless access points on that channel before switching to a different channel at blocks 186 and 188. The RSSI is measured and the wireless system RSSI trend is updated using EWMA technique at block 190. At block 192, the mobile device switches back to the original channel where it is associated to the wireless system. The mobile device then transmits a PSM awake message to the then connected wireless access point as a result of which the wireless access point releases the packets stored in the buffer to the mobile node at block 184. Also the mobile node releases its buffer and restarts the transmission. At block 198, the available wireless systems list 161 is reordered based on the results from the background monitoring. The background monitoring may occur periodically or upon the available wireless systems list 161 becoming depleted as shown at block 200. At block 210, the available wireless systems list 161 is updated.

The updating of the backup wireless systems lists is now discussed. The channels which are to be probed are identified at block 212. At block 214, a delay between the periodic probing occurs. The mobile device instructs the then-connected wireless system to begin buffering by sending a PSM message to the wireless system at block 216. The mobile device switches the channel and sends a PROB_REQ at blocks 218 and 220. A determination of whether a wireless system with an acceptable RSSI has responded is performed at block 222. If a wireless system with an acceptable RSSI has responded, then an IP address is reserved and the available wireless systems list 161 is updated based on the subnet. Otherwise, the mobile device switches back to the original channel at block 226. The mobile device then requests the then-connected wireless system to flush its buffer at block 228. The wireless system will respond by transmitting any buffered data packets to the mobile device. The probing continues until the number of wireless systems discovered satisfies the backup wireless systems lists. The mobile device is switched back into a normal processing mode at block 232.

Referring to FIGS. 7A-7D, message diagrams illustrating the process of handing off mobile devices between wireless systems according to the present invention, are shown.

The present invention thus includes a computer program which may be hosted on a storage medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. A method for managing handoff of a mobile device between wireless access points, the method comprising:
   during a networking initialization phase for a mobile device, scanning channels from the mobile device to detect wireless access points, building a candidate list in the mobile device, wherein the candidate list contains entries representing candidate wireless access points from among the detected access points, reserving Internet protocol (IP) addresses for the mobile device on the access points in the candidate list, and establishing a communication connection between the mobile device and a first access point among the access points in the candidate list via a first IP address among the reserved IP addresses, wherein the first access point belongs to a first sub-network and a first channel;
   after the networking initialization phase, switching the mobile device to a normal processing mode;
   periodically switching the mobile device from the normal processing mode to a background monitoring phase;
   during the background monitoring phase, performing monitoring operations by the mobile device, the monitoring operations comprising:
      instructing the first access point to begin buffering packets by sending a first power saving mode (PSM) message from the mobile device to the first access point;
      after sending the first PSM message to the first access point, switching the mobile device from the first channel to a different channel, detecting signal strength on the different channel for at least one access point from the candidate list, and then switching the mobile device back to the first channel;
      after switching the mobile device back to the first channel, instructing the first access point to release the buffered packets to the mobile device by transmitting a second PSM message to the first access point, wherein the second PSM message comprises a PSM awake message;
   determining whether any access points should be removed from the candidate list, based on the signal strength detected in the background monitoring phase;
   in response to a determination that one or more access points should be removed from the candidate list, removing said one or more access points from the candidate list;
   determining whether an additional access point should be added to the candidate list, based on a threshold number of access points;
   in response to a determination that an additional access point should be added to the candidate list, performing candidate list replenishment operations comprising:
      instructing the first access point to begin buffering packets by sending a third PSM message from the mobile device to the first access point;
      after sending the third PSM message to the first access point, (a) switching the mobile device from the first channel to a new channel, (b) determining whether an access point on the new channel has an acceptable signal strength, (c) in response detecting an access point on the new channel with an acceptable signal strength, reserving an IP address for the mobile device on the detected access point and adding the detected access point to the candidate list, and (d) switching the mobile device back to the first channel;
      after switching the mobile device back to the first channel, instructing the first access point to release the buffered packets to the mobile device by transmitting a fourth PSM message to the first access point, wherein the fourth PSM message comprises a PSM awake message; and
   outside of the background monitoring phase, upon detection of a predetermined threshold of signal strength associated with a need to handoff from the first access point, selecting a second access point from the candidate list, and transferring communication to the second access point in association with a second IP address that was reserved on the second access point for the mobile device before the mobile device detected the need to handoff from the first access point.

2. The method of claim 1, wherein the IP addresses are reserved from DHCP servers.

3. The method of claim 1, wherein the IP addresses are self configured in IPV6.

4. The method of claim 1, further comprising buffering communications between the mobile device and the first access point during the transfer.

5. The method of claim 1, wherein the transferring communication occurs prior to a loss of signal between the mobile device and the first access point.

6. The method of claim 1, wherein the predetermined threshold pertains to deterioration of the signal strength associated with the first access point.

7. The method of claim 5, wherein the communications from the first access point are monitored beyond the predetermined threshold.

8. The method of claim 1, wherein the mobile device performs the candidate list replenishment operations in response to the candidate list being depleted of candidate access points other than the first access point.

9. The method of claim 1, wherein the operation of selecting a second access point from the candidate list comprises:
   comparing the sub-network of the first access point and other access points from the candidate list; and
   automatically selecting one of the other access points in the first sub-network, in preference to one of the other access points in a different sub-network from the first sub-network.

10. The method of claim 1, further comprising updating routing table information associated with the second access point.

11. The method of claim 9, further comprising keeping sub-network addresses alive using control messages.

12. The method of claim 1, wherein the monitoring operations performed during the background monitoring phase by the mobile device do not have a substantial negative affect on the performance of the mobile device.

13. The method of claim 1, further comprising buffering communications between the mobile device and the network associated with the first access point during the monitoring operations, wherein buffering communications comprises utilizing inline buffering at the mobile node.

14. An article of manufacture comprising:
   machine-readable storage medium; and
   instructions in the machine-readable storage medium, which, when executed by a mobile device, cause the mobile device to perform operations comprising:
      during a networking initialization phase for the mobile device, scanning channels from the mobile device to detect wireless access points, building a candidate list in the mobile device, wherein the candidate list contains entries representing candidate wireless access points from among the detected access points, reserving Internet protocol (IP) addresses for the mobile device on the access points in the candidate list, and establishing a communication connection between the mobile device and a first access point among the access points in the candidate list via a first IP address among the reserved IP addresses, wherein the first access point belongs to a first sub-network and a first channel;

after the networking initialization phase, switching the mobile device to a normal processing mode;

periodically switching the mobile device from the normal processing mode to a background monitoring phase;

during the background monitoring phase, performing monitoring operations by the mobile device, the monitoring operations comprising:

instructing the first access point to begin buffering packets by sending a first power saving mode (PSM) message from the mobile device to the first access point;

after sending the first PSM message to the first access point, switching the mobile device from the first channel to a different channel, detecting signal strength on the different channel for at least one access point from the candidate list, and then switching the mobile device back to the first channel;

after switching the mobile device back to the first channel, instructing the first access point to release the buffered packets to the mobile device by transmitting a second PSM message to the first access point, wherein the second PSM message comprises a PSM awake message;

determining whether any access points should be removed from the candidate list, based on the signal strength detected in the background monitoring phase;

in response to a determination that one or more access points should be removed from the candidate list, removing said one or more access points from the candidate list;

determining whether an additional access point should be added to the candidate list, based on a threshold number of access points;

in response to a determination that an additional access point should be added to the candidate list, performing candidate list replenishment operations comprising:

instructing the first access point to begin buffering packets by sending a third PSM message from the mobile device to the first access point;

after sending the third PSM message to the first access point, (a) switching the mobile device from the first channel to a new channel, (b) determining whether an access point on the new channel has an acceptable signal strength, (c) in response detecting an access point on the new channel with an acceptable signal strength, reserving an IP address for the mobile device on the detected access point and adding the detected access point to the candidate list, and (d) switching the mobile device back to the first channel;

after switching the mobile device back to the first channel, instructing the first access point to release the buffered packets to the mobile device by transmitting a fourth PSM message to the first access point, wherein the fourth PSM message comprises a PSM awake message; and outside of the background monitoring phase, upon detection of a predetermined threshold of signal strength associated with a need to handoff from the first access point, selecting a second access point from the candidate list, and transferring communication to the second access point in association with a second IP address that was reserved on the second access point for the mobile device before the mobile device detected the need to handoff from the first access point.

15. The article of manufacture of claim 14, wherein:

the operation of reserving an IP address for the mobile device on the detected access point during the candidate list replenishment operations comprises reserving the IP address for the mobile device on a second sub-network; and when the second access point operates on the second sub-network, the operation of transferring communication to the second access point comprises using the IP address that was reserved for the mobile device on the second sub-network during the candidate list replenishment operations to transfer communication from the first sub-network to the second sub-network, such that no IP address need be allocated for the mobile device on the second sub-network during handoff processing.

16. The article of manufacture of claim 14, wherein the operation of selecting the second access point comprises:

comparing the sub-network of the first access point and other access points in the candidate list; and automatically selecting one of the other access points in the first sub-network, in preference to one of the other access points in a different sub-network from the first sub-network.

* * * * *